United States Patent
Jaeger et al.

(10) Patent No.: US 10,442,349 B2
(45) Date of Patent: Oct. 15, 2019

(54) LIGHTING ELEMENT AND LOUDSPEAKER FOR A MOTOR VEHICLE

(71) Applicant: Dr. Ing. h.c. F. Porsche Aktiengesellschaft, Stuttgart (DE)

(72) Inventors: Robert Jaeger, Sindelfingen (DE); Dirk Brinkmann, Wiernsheim (DE); Heinz Czemmel, Rutesheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 112 days.

(21) Appl. No.: 15/680,245

(22) Filed: Aug. 18, 2017

(65) Prior Publication Data
US 2018/0056859 A1     Mar. 1, 2018

(30) Foreign Application Priority Data
Aug. 25, 2016 (DE) .......................... 10 2016 115 750

(51) Int. Cl.
 *B60Q 3/64* (2017.01)
 *B60Q 3/20* (2017.01)
 *H04R 1/02* (2006.01)

(52) U.S. Cl.
 CPC .............. *B60Q 3/64* (2017.02); *B60Q 3/20* (2017.02); *H04R 1/023* (2013.01); *H04R 1/028* (2013.01); *H04R 2499/13* (2013.01)

(58) Field of Classification Search
 CPC . B60Q 3/20; B60Q 3/64; H04R 1/023; H04R 1/028
 See application file for complete search history.

(56) References Cited

U.S. PATENT DOCUMENTS

| | | | | |
|---|---|---|---|---|
| 6,000,493 A | * | 12/1999 | Chen ................ | H04R 1/028 181/141 |
| 2005/0002199 A1 | * | 1/2005 | Stuffle ................ | B60R 11/0217 362/487 |
| 2007/0223770 A1 | * | 9/2007 | Fujisawa ............ | F21V 33/0056 381/396 |
| 2011/0080733 A1 | * | 4/2011 | Wang ................ | F21V 21/04 362/253 |
| 2011/0170304 A1 | * | 7/2011 | Fujita ................ | G02B 6/0008 362/501 |
| 2011/0235845 A1 | * | 9/2011 | Wang ................ | H04R 1/26 381/386 |
| 2015/0003093 A1 | * | 1/2015 | Omura ................ | B60Q 3/51 362/511 |
| 2015/0253481 A1 | * | 9/2015 | Sakanashi .......... | B60N 3/10 362/611 |

* cited by examiner

*Primary Examiner* — Jong-Suk (James) Lee
*Assistant Examiner* — Christopher E Dunay
(74) *Attorney, Agent, or Firm* — Leydig, Voit & Mayer, Ltd.

(57) ABSTRACT

A lighting element for a passenger compartment of a motor vehicle includes a diffuser; an elongated light guide, wherein the light guide is at least partially accommodated in the diffuser; and a reflector arranged on an inner side of the diffuser and having a reflective surface facing the light guide. The reflector is configured to reflect light from the light guide to an outer side of the light guide. The reflector has a rough surface in order to reflect light from the light guide diffusely.

19 Claims, 4 Drawing Sheets

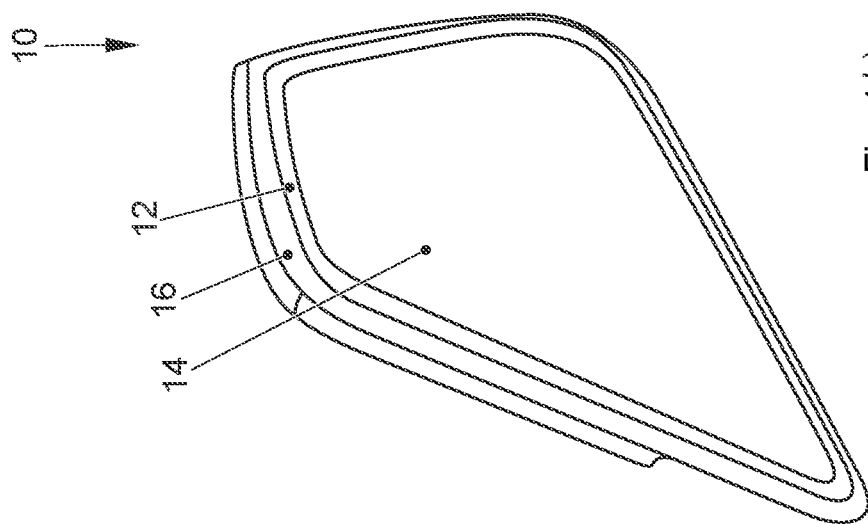
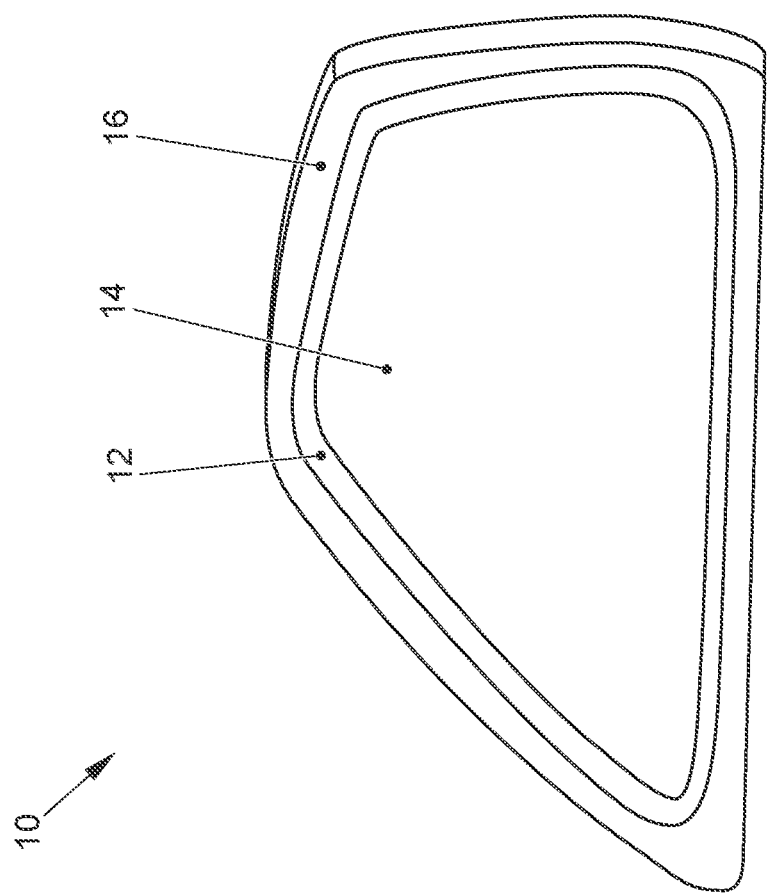

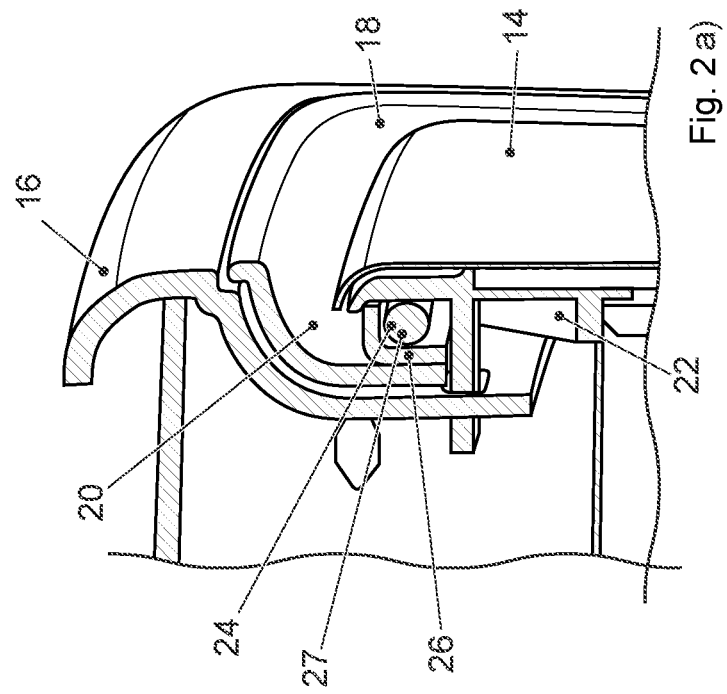
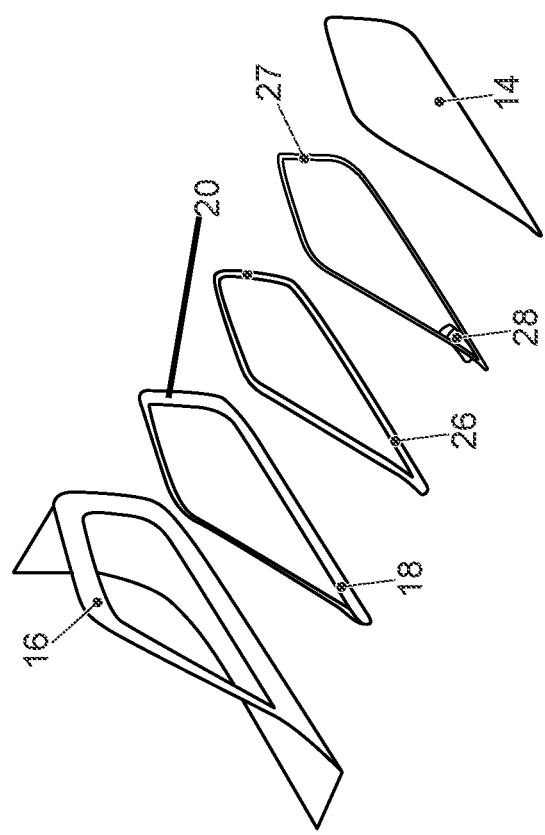

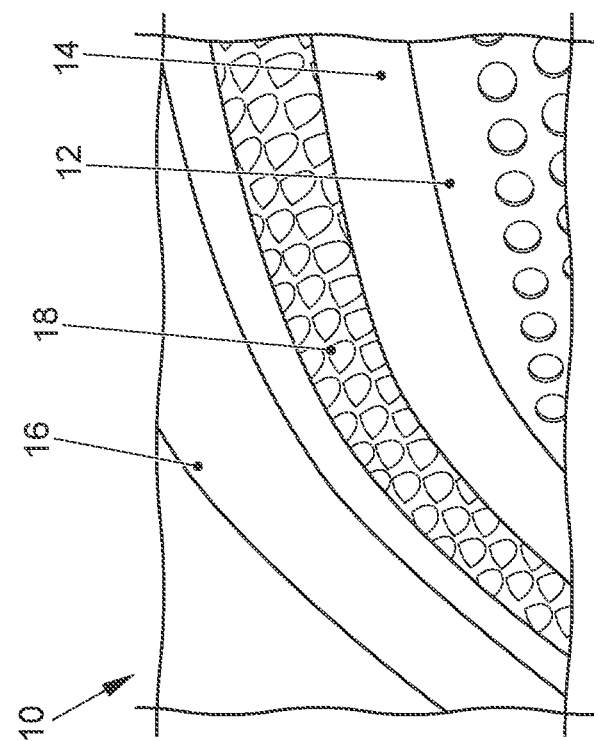
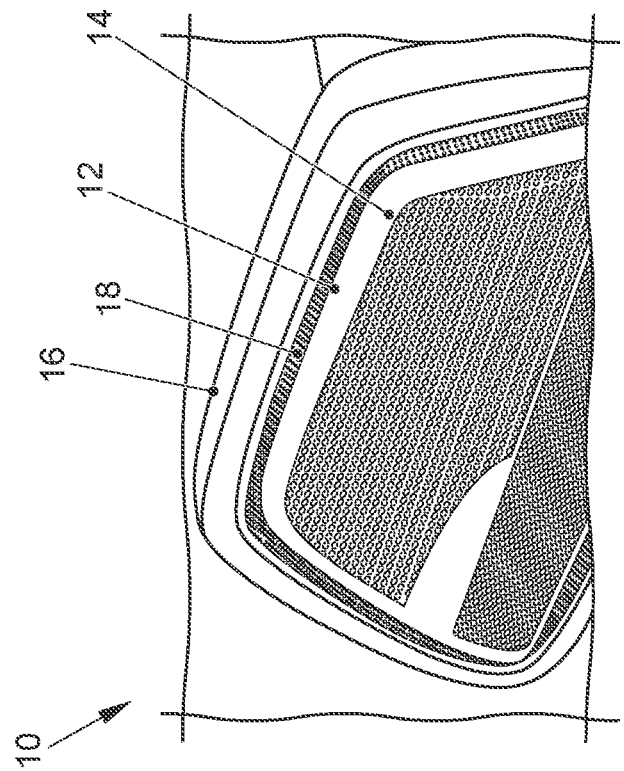

LIGHTING ELEMENT AND LOUDSPEAKER FOR A MOTOR VEHICLE

CROSS REFERENCE TO RELATED APPLICATIONS

This application claims benefit to German Patent Application No. DE 10 2016 115 750.3, filed Aug. 25, 2016, which is hereby incorporated by reference herein.

FIELD

The present invention relates to a lighting element for the passenger compartment of a motor vehicle. The invention also relates to a loudspeaker for a motor vehicle having a loudspeaker grille which covers the loudspeaker, and a lighting element which at least partially surrounds the loudspeaker.

BACKGROUND

In modern motor vehicles, to a certain extent annular light guides are arranged at exposed positions and, for example, on loudspeakers, said light guides emitting white or colored light through a diffuser and surrounding, for example, a loudspeaker grille or other electrical component in order to generate an indirect ambient light. A diffuser which is assigned to the light guide homogenizes the light, which is therefore incident on a reflector and is distributed uniformly in space. Residual light, which escapes to an inner side, is usually reflected by means of white carrier material and correspondingly fed to the ambient lighting system. This carrier material simultaneously prevents the emission of light, for example through the loudspeaker grille, which would be visible on the loudspeaker grille.

However, when there is a flat viewing angle onto the light guide or the loudspeaker a dark point appears in the region of sharp corners or bends of the light guide, at which dark point the reflected light is reflected into the footwell of the motor vehicle. This can disrupt the aesthetics of the passenger compartment of the vehicle and cause a low-quality appearance.

SUMMARY

In an embodiment, the present invention provides a lighting element for a passenger compartment of a motor vehicle. The lighting element includes a diffuser; an elongated light guide, wherein the light guide is at least partially accommodated in the diffuser; and a reflector arranged on an inner side of the diffuser and having a reflective surface facing the light guide. The reflector is configured to reflect light from the light guide to an outer side of the light guide. The reflector has a rough surface in order to reflect light from the light guide diffusely.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 1a, b show two schematic drawings of a loudspeaker of a motor vehicle with a lighting element;

FIG. 2a shows a schematic sectional view of the lighting element for the loudspeaker from FIG. 1;

FIG. 2b shows a schematic perspective exploded illustration of the lighting element from FIG. 2a;

FIGS. 5a, b show a loudspeaker with a loudspeaker grille and a lighting element which is structured in order to reflect light diffusely.

DETAILED DESCRIPTION

Figure 4:
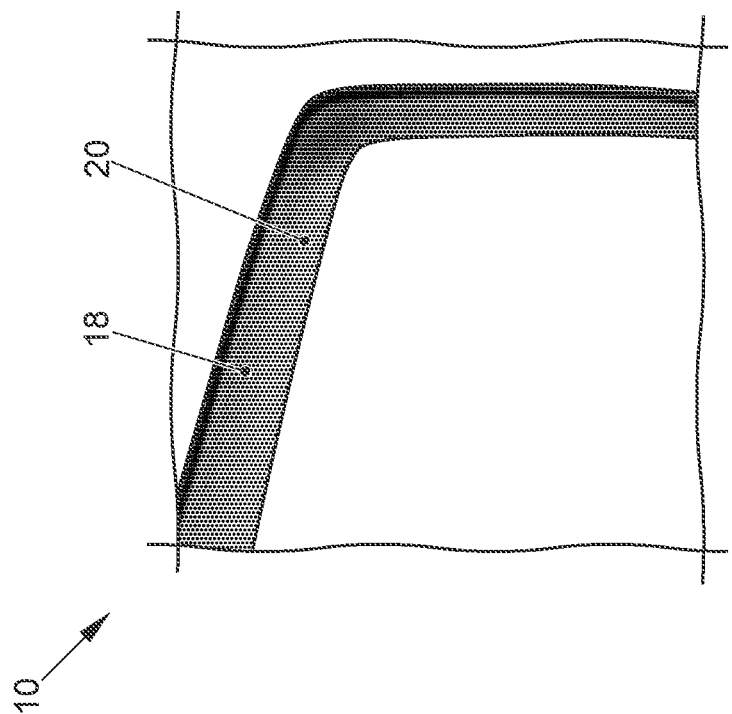
FIG. 4 shows a perspective illustration of an illuminated reflector with a roughened surface.

Embodiments of the invention described herein can make available uniform emission of light through the reflector so that uniform illumination can be made available.

A lighting element is described herein in having a reflector that has a rough reflective surface in order to reflect light from the light guide diffusely.

A loudspeaker is described herein for a motor vehicle having a lighting element according to the present invention.

By virtue of the reflector having a rough surface, the light which is incident on any sections of the reflector is emitted diffusely in all different directions, with the result that each section of the reflector, and correspondingly each section of the border surrounding the loudspeaker, emits light. As a result, dark points in the region of sharp edges or bends of the border of the loudspeaker are avoided and uniform illumination is achieved.

In one preferred embodiment, the lighting element has a lightproof element on the outer side of the light guide, in order to prevent direct inputting of light to the outer side from the light guide. As a result beams can be prevented from passing through a component of the motor vehicle which is surrounded by the lighting element, in particular light can be prevented from shining through a loudspeaker. In this context it is particularly preferred if the lightproof element has a reflective layer facing the light guide. As a result, leakage of light in the direction of the outer side of the lighting element can generally be reliably prevented with simple means, wherein at the same time the light of the light guide which is emitted to the outer side is reflected to the reflector and can be correspondingly fed to the ambient lighting system of the passenger compartment of the motor vehicle.

In one preferred embodiment, the surface of the reflector has bumps for reflecting the light diffusely. As a result, diffuse reflection of the light can be achieved with simple means, wherein the light is prevented from being reflected to a point facing away in the vehicle, for example into the footwell.

In one alternative embodiment, the surface of the reflector has a matte surface coating in order to reflect the light diffusely. As a result, particularly uniform treatment of the surface of the reflector can be achieved, as a result of which the light is reflected in uniformly diffuse fashion.

In a further preferred embodiment, the surface of the reflector is not galvanized. As a result, a diffuse reflection can be achieved with low technical expenditure.

In one preferred embodiment the surface of the reflector is structured in order to reflect the light diffusely. As a result, targeted diffuse reflection can be achieved, wherein at the same time the reflector forms a pleasant and high quality appearance in the bright illuminated space.

In one preferred embodiment, the lighting element is embodied as a border around a loudspeaker. As a result it is possible to make available pleasant interior lighting of the motor vehicle and indirect ambient light, which generally increases the high-quality impression of the loudspeaker and of the passenger compartment.

Overall, lighting elements according to various embodiments of the invention can make available a uniform indirect ambient light as a strip of light in the passenger compartment of the motor vehicle, wherein continuous uniform lighting or brightness can be made available at bends or curves of the strip of light. As a result, an attractive and high-quality appearance of the strip of light and of the associated element in the motor vehicle can be made available.

A loudspeaker for a passenger compartment of a motor vehicle is illustrated in in FIG. 1a and denoted generally by 10. The loudspeaker 10 has an elongated lighting element which is generally denoted by 12. The loudspeaker 10 also has a loudspeaker grille 14 and a frame 16. In the plan view illustrated in FIG. 1a, the elongated lighting element 12 is arranged between the loudspeaker grille 14 and the frame 16. In the embodiment illustrated in FIG. 1, the lighting element 12 in the plan view illustrated in FIG. 1 surrounds the loudspeaker grille completely, with the result that a polygon is formed around the loudspeaker grille 14 by the lighting element 12. The lighting element 12 can emit white light or colored light and emits indirect ambient light which is reflected by a reflector, as is explained in more detail below.

FIG. 1b illustrates a schematic partial view of the loudspeaker 10 from FIG. 1a. At the upper corner of the polygon formed by the lighting element 12 a dark point is produced as a result of the fact that the angle of incidence of the light onto the reflector is oriented unfavorably with respect to the viewer. As a result, the light which is input at this corner point irradiates in the direction of the footwell of the motor vehicle, with the result that this region appears dark from the vehicle occupants' point of view. In order to eliminate this phenomenon, according to the invention a surface of the reflector is roughened at least at this location, that is to say the light is emitted diffusely from this section of the reflector into the passenger compartment of the motor vehicle and the dark point therefore appears bright. The roughening of the surface of the diffuser can be achieved by bumps on the surface, a matte surface coating, non-galvanization or structuring of the reflector.

FIG. 2a illustrates a schematic sectional view of the lighting element 12 and of part of the loudspeaker 10. A curved reflector 18, which protrudes from the loudspeaker grille 14 in the radial direction, is mounted on the frame 16 of the loudspeaker 10. The reflector 18 is curved toward an outer side of the loudspeaker 10, with the result that a curved reflective surface 20 is produced which circumferentially surrounds the loudspeaker grille 14 in a plan view. A carrier 22, to which the loudspeaker grille 14 is secured, is also mounted on the frame 16. A light guide 27, which is at least partially surrounded by a diffuser 26, is arranged between the carrier 22 and the reflector 18. The diffuser 26 is arranged between the light guide 27 and the reflective surface 20 in order to scatter the light of the light guide 27 diffusely and correspondingly permit diffuse emission of the light through the reflector 18. The carrier 22 has on its inner side, assigned to the light guide 27, a reflective layer in order to be opaque and correspondingly prevent light irradiating into the passenger compartment through the loudspeaker grille 14.

FIG. 2b is an exploded illustration of the frame 16, of the reflector 18, of the diffuser 26, of the light guide 27 and of a light source 28 and of the loudspeaker grille 14. In order to ensure diffuse reflection by the reflective surface 20, the reflective surface 20 is roughened.

Figure 3:
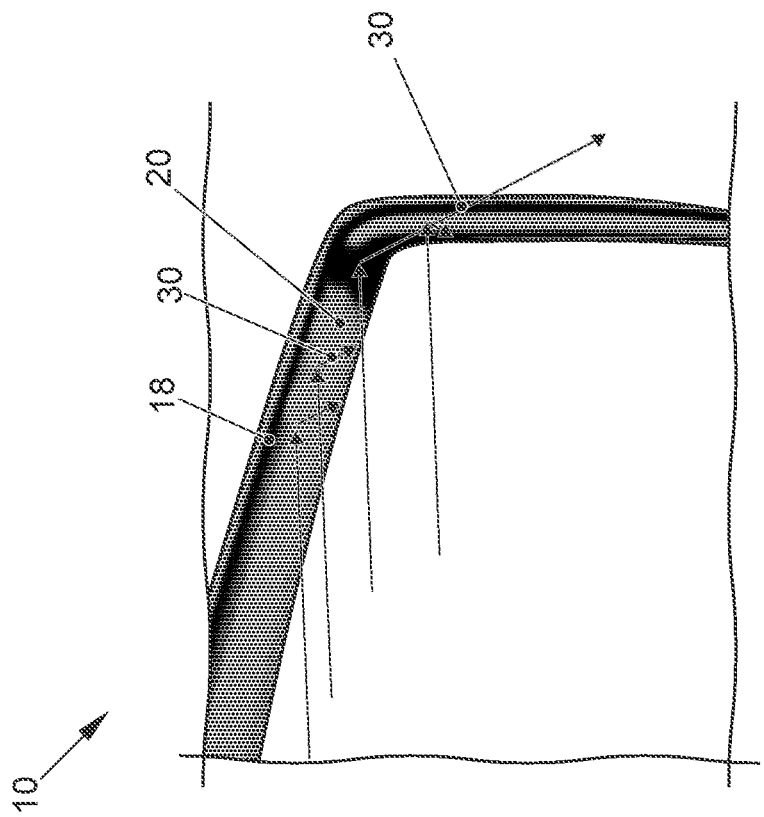
FIG. 3 shows a schematic illustration of a reflector with a dark point.

FIG. 3 is a schematic illustration of the reflector 18 with a dark point in the region of a bend of the reflector 18, which dark point is caused by insufficient scattering of the light of the light guide 27 at the diffuser 26. Light beams 30 of the emitted light of the light guide 27 are correspondingly illustrated schematically in FIG. 3.

FIG. 4 is a schematic illustration of the reflector 18 at which the reflective surface 20 is roughened, with the result that the dark point, as shown in FIG. 3, does not occur as a result of diffuse reflection of the light beams 30. As a result of the diffuse scattering, a uniform emission of light by the reflector 18 is correspondingly also possible in the region of bends or the like.

FIG. 5a is a schematic perspective illustration of the loudspeaker 10 with structuring of the reflective surface 20. The reflector 18 correspondingly has a pattern of depressions which permit diffuse emission of light of the light beams 30 of the light guide 27. The structuring of the reflector 18 can have any desired structures in order to permit corresponding diffuse scattering of the light and at the same time make available a high-quality appearance in the bright state given corresponding ambient light.

FIG. 5b illustrates an example of particular structuring of the reflective surface 20 in order to achieve diffuse scattering of the light.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:
1. A lighting element for a passenger compartment of a motor vehicle, the lighting element comprising:
   a diffuser having a first section and a second section, the second section extending, from the first section, towards an interior of the vehicle;

an elongated light guide disposed, relative to the first section, towards the interior of the vehicle, wherein the light guide is at least partially accommodated in the diffuser; and a reflector having a first section and a second section, the second section extending, from the first section, towards the interior of the vehicle, wherein the first section of the reflector is disposed, relative to the first section of the diffuser, towards the exterior of the vehicle, wherein both the first section and the second section of the reflector include a reflective surface facing the light guide and being configured to reflect light from the light guide towards the interior of the vehicle, wherein the diffuser is disposed in an optical path between the light guide and the reflective surfaces of the first section and the second section of the reflector such that the light from the light guide reflected by the reflective surfaces passes through the diffuser before being reflected, and wherein the reflective surfaces of the first section and the second section of the reflector are roughened in order to diffusely reflect the light from the light guide.

2. The lighting element as claimed in claim 1, further comprising a lightproof element disposed, relative to the light guide, towards the interior of the vehicle.

3. The lighting element as claimed in claim 2, wherein the lightproof element has a reflective layer facing the light guide.

4. The lighting element as claimed in claim 1, wherein the reflective surfaces of the first and second sections of the reflector are roughened by the provision of bumps configured to diffusely reflect the light from the light guide.

5. The lighting element as claimed in claim 1, wherein the reflective surfaces of the first and second sections of the reflector have a matte surface coating configured to diffusely reflect the light from the light guide.

6. The lighting element as claimed in claim 1, wherein the reflective surfaces of the first and second sections of the reflector are structured in order to diffusely reflect the light from the light guide.

7. The lighting element as claimed in claim 1, wherein the lighting element is embodied as a border around a loudspeaker.

8. The lighting element as claimed in claim 1, wherein both the light guide and the second section of the diffuser have a shape that at least partially encloses an interior region, wherein the second section of the diffuser is disposed beyond a perimeter of the light guide such that the light guide is positioned between the interior region and the second section of the diffuser.

9. The lighting element as claimed in claim 8, wherein the second section of the reflector has a shape that at least partially encloses the interior region and is disposed beyond a perimeter of the second section of the diffuser such that the second section of the diffuser is positioned between the interior region and the second section of the reflector.

10. The lighting element as claimed in claim 9, further comprising a frame.

11. The lighting element as claimed in claim 10, wherein the frame include a first section, a second section, and a third section, wherein the first section of the frame is disposed, relative to the first section of the reflector, towards the exterior of the vehicle, wherein the second section of the reflector is positioned between the interior region and the second section of the frame, and wherein the third section of the frame extends from the second section of the frame towards the exterior of the vehicle.

12. The lighting element as claimed in claim 8, wherein a loudspeaker is provided in the interior region.

13. The lighting element as claimed in claim 8, wherein both the light guide and the second section of the diffuser have a shape that completely encloses the interior region.

14. The lighting element as claimed in claim 13, wherein both the light guide and the second section of the diffuser have a polygonal shape.

15. The lighting element as claimed in claim 1, wherein the first and second reflective surfaces of the reflector are joined together by a curved joint region so as to form a single curved reflective surface.

16. A loudspeaker for a motor vehicle, the loudspeaker comprising:
a loudspeaker grille that covers the loudspeaker, and
a lighting element that at least partially borders the loudspeaker, the lighting element including:
a diffuser having a first section and a second section, the second section extending, from the first section, towards an interior of the vehicle;
an elongated light guide disposed, relative to the first section, towards the interior of the vehicle, wherein the light guide is at least partially accommodated in the diffuser; and
a reflector having a first section and a second section, the second section extending, from the first section, towards the interior of the vehicle, wherein the first section of the reflector is disposed, relative to the first section of the diffuser, towards the exterior of the vehicle, wherein both the first section and the second section of the reflector include a reflective surface facing the light guide and being configured to reflect light from the light guide to an outer side of the light guide,
wherein the diffuser is disposed in an optical path between the light guide and the reflective surfaces of the first section and the second section of the reflector such that the light from the light guide reflected by the reflective surfaces passes through the diffuser before being reflected, and
wherein the reflective surfaces of the first section and the second section of the reflector are roughened in order to diffusely reflect the light from the light guide.

17. The loudspeaker as claimed in claim 16, wherein both the light guide and the second section of the diffuser have a shape that at least partially encloses the loudspeaker, wherein the second section of the diffuser is disposed beyond a perimeter of the light guide such that the light guide is positioned between the loudspeaker and the second section of the diffuser.

18. The loudspeaker as claimed in claim 17, wherein the second section of the reflector has a shape that at least partially encloses the loudspeaker and is disposed beyond a perimeter of the second section of the diffuser such that the second section of the diffuser is positioned between the loudspeaker and the second section of the reflector.

19. The loudspeaker as claimed in claim 18, wherein the loudspeaker grill extends beyond a perimeter of the loudspeaker, beyond the perimeter of the light guide, and beyond the perimeter of the second section of the diffuser.

* * * * *